United States Patent
Agulnik et al.

(10) Patent No.: US 8,155,684 B2
(45) Date of Patent: Apr. 10, 2012

(54) SYSTEM AND METHOD FOR CONTROLLING USE OF UPLINK RANDOM ACCESS CHANNELS (RACHS) BASED ON MULTI-DIMENSIONAL SUBSCRIBER CLASSIFICATION

(75) Inventors: Anatoly Agulnik, Deerfield, IL (US); Rod A. Averbuch, Chicago, IL (US); Michael Barnea, Highland Park, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 510 days.

(21) Appl. No.: 12/409,994

(22) Filed: Mar. 24, 2009

(65) Prior Publication Data

US 2010/0248680 A1  Sep. 30, 2010

(51) Int. Cl.
 *H04B 7/00* (2006.01)
(52) U.S. Cl. ............... 455/515; 455/519; 455/452.1
(58) Field of Classification Search ........... 455/518–521
 See application file for complete search history.

(56) References Cited

U.S. PATENT DOCUMENTS

| 7,065,366 | B2 | 6/2006 | Cave |
| 7,746,833 | B2 * | 6/2010 | Terry .............................. 370/335 |
| 2002/0041578 | A1 | 4/2002 | Kim et al. |
| 2007/0147326 | A1 | 6/2007 | Chen |
| 2008/0225785 | A1 * | 9/2008 | Wang et al. .................... 370/329 |
| 2010/0042716 | A1 * | 2/2010 | Farajidana et al. ........... 709/224 |

FOREIGN PATENT DOCUMENTS

| WO | 2007024791 A2 | 3/2007 |
| WO | WO2007078165 A1 | 7/2007 |

OTHER PUBLICATIONS

PCT International Search Report Dated Oct. 21, 2010.

* cited by examiner

*Primary Examiner* — James H Cho
(74) *Attorney, Agent, or Firm* — Randi L. Karpinia; Daniel R. Bestor (57) ABSTRACT

Systems and methods are provided for controlling use of uplink random access channels (RACHs) based on multi-dimensional subscriber classification. These systems and methods are useful in cellular communication networks that implement, for example, a public safety cellular system.

19 Claims, 5 Drawing Sheets

SYSTEM AND METHOD FOR CONTROLLING USE OF UPLINK RANDOM ACCESS CHANNELS (RACHS) BASED ON MULTI-DIMENSIONAL SUBSCRIBER CLASSIFICATION

FIELD OF THE DISCLOSURE

The present disclosure relates generally to wireless communication networks and more particularly to public safety wireless communication networks and controlling use of uplink random access channels (RACHs).

BACKGROUND

In a wireless cellular network, such as those which comply with standards such $3^{rd}$ Generation Partnership Project (3GPP), $3^{rd}$ Generation Partnership Project 2 (3GPP2), Universal Mobile Telephone Service (UMTS) or Wideband CDMA (WCDMA), Long Term Evolution (LTE), etc., a wireless communication device (WCD) (also referred to as a mobile station (MS), mobile unit (MU), subscriber station, user equipment (UE)) communicates with a fixed base station (BS) that is coupled to a wired core network. The BS has a particular coverage area or range that defines a cell site or "cell" in the cellular network. When the WCD is located within a cell site defined by a particular BS, the WCD can communicate over a wireless link with the BS. The WCD can move geographically, and when the WCD moves out of range of the BS, it may connect or "handover" to a new BS and starts communicating through the new BS.

Physical and Logical Channels for WCD and BS Communication

Each cell site utilizes a number of physical radio channels for communications between the BS and the WCD(s) within communication range of that BS. Uplink channels are used by a WCD to communicate information to the BS, whereas downlink channels are used by a BS to communicate information to WCDs. The bandwidth of the uplink channel and downlink channel is fixed. The uplink bandwidth is divided into a number of physical radio channels that are each a portion of the available uplink bandwidth capacity. Each physical radio channel can support a number of logical channels. These logical channels are used to carry out defined "functions" within a physical channel. In general, logical channels can be used to carry either (1) traffic/data information, or (2) control/signaling information. The BS dynamically controls usage of these logical channels by a particular WCD or particular groups of WCDs. Each channel be classified as being either common (i.e., shared by all WCDs) or dedicated (i.e., for use by a particular WCD or group of WCDs). Traffic channels are dedicated meaning that they are reserved for use by a particular WCD or group of WCDs. Control channels can be either common or dedicated. Common control channels provide control information for more than one WCDs and are thus "shared" resources, whereas dedicated control channels provide control information for one WCD.

Random Access Channel (RACH) Resources

One common or shared control channel is the uplink Random Access Channel (RACH). One or more RACHs can be implemented in a portion of the uplink bandwidth; the number of RACHs is semi-static meaning that a certain number of RACHs are allocated and this number does not change dynamically based on changes in loading within the cell that is defined by the base station. These RACHs are used by WCDs to transmit a relatively small amount of data to the BS.

For example, the RACH can be used by a WCD to gain initial access to the cellular network (e.g., for call origination, registration messages, and paging response). It can be used by the WCD to get the attention of a BS in order to initially synchronize its transmission with the BS and gain access to the network. The WCD can also use a RACH to request services or dedicated uplink/downlink resources (or bandwidth) from the BS. The RACH can also be used for short data bursts (e.g., non-real-time dedicated control or traffic data, for example, sending Short Messaging Service (SMS) packets). For instance, when operating idle mode, the WCD continuously monitors a control channel from the BS to determine if there is an incoming call for that WCD. In particular, when a call is sent to the WCD, the BS sends a page message to the WCD on the control channel, and the WCD responds by sending a message on a RACH to let the network know which particular cell the WCD is currently in. By contrast, when the WCD attempts to initiate a call, the WCD sends a request message to the BS on a RACH to let the network know which particular cell the WCD is currently in. The WCD can also transmit messages over the RACH to negotiate reservation of a dedicated resources (traffic channels and control/signaling channels) with the BS. Once negotiated, the WCD can then use these resources in a communication session with the BS.

Because the RACH is a shared resource, messages transmitted on the RACH are not scheduled (in contrast to messages transmitted on a dedicated channel that is assigned exclusively to one WCD at a time). At the same time, as noted above, the number of uplink RACHs in each cell site is normally semi-static and is fixed based on the average distributed load on specific cells, anticipated average system capacity, etc. As such, when the traffic load within a cell increases (e.g., the number of users in a specific cell increases or the activity of existing users in a specific cell increases) well beyond its average load, many users will be attempting to use the same fixed amount of uplink RACHs. When two or more subscribers simultaneously attempt to use the same uplink RACH this can result in collisions. For example, it has recently been proposed that a portion of the 700 megahertz cellular spectrum will allocated for public safety use during deployment of public safety networks, for example, at an incident scene. In these type of networks, the traffic load in cells that are near the incident scene increases greatly as an incident escalates, and then following the incident returns to more normal or average levels. It is critical that public safety workers have access to the network during the incident and not competing with other users for RACHs needed to establish a communication session.

Thus, in some situations, it may be desirable to restrict usage of particular uplink RACHs to particular set of WCDs.

Static Subscriber Classes

In some cellular networks, such as those that comply with 3GPP and 3GPP2 standards, subscribers can be statically classified into groups or classes. One way to prevent a particular subscriber/WCD from using certain uplink RACH is by: (1) grouping subscribers into general "static" classes (e.g., permitted access class or restricted access class), (2) advertising information from the BS that specifies whether WCDs belonging to particular classes are allowed (or not allowed) to use particular uplink RACHs in its cell, and (3) blocking particular subscriber WCDs from using particular uplink RACHs if they belongs to the restricted access class. However, one problem with this "one-dimensional" static classification approach (i.e., grouping subscribers into either a permitted or a restricted access class) is that some subscribers are allowed to use all applications, while others are not allowed to use any applications regardless of the application type. In other words, it is an "all-or none" approach. It would also be desirable to allow more users to be authorized to use certain basic services or perform certain applications, while still restricting their access to other services or applications.

Moreover, the rejection of a request during the first access attempt (e.g., by blocking the subscriber on the application level) will likely cause the subscriber WCD to retry and make additional access attempts using the uplink RACH. Therefore the total amount of access attempts using the uplink RACH is likely to increase, and this can potentially create a bottleneck condition on the uplink RACH and increase blocking probability with respect to other subscriber WCDs that are also attempting to use the uplink RACH.

In addition, in certain situations it is undesirable to statically allocate uplink RACHs to particular classes of subscribers. Static allocation of uplink RACHs could result in too few or too many uplink RACHs being allocated for use by public safety subscribers since the peak cell load is not statically distributed and varies greatly throughout the course of an incident.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

It would be desirable to provide techniques for preventing WCDs from attempting to use specific uplink RACHs in the first place. According to one embodiment, a method is provided for controlling use of particular uplink random access channels (RACHs) by WCDs in a cell. In one implementation, a device, which can be any infrastructure component such as a command station, is designed to control use of particular uplink random access channels (RACHs) by wireless communication devices (WCDs) operating in a cellular network. The device is designed to define a plurality of subscriber classes, designate at least one of uplink RACH for each subscriber class, and generate mapping information that maps each particular subscriber class to one or more of the uplink RACHs designated for use by that particular subscriber class. Each subscriber class is dynamically defined based on a plurality of subscriber class dimensions. Examples of subscriber class dimensions include two or more of a user type dimension, an application type dimension, an incident characteristics dimension, a user function dimension, a location dimension, a presence dimension and an application priority dimension. Any WCD belonging to a particular subscriber class is permitted to use uplink RACHs designated for that particular subscriber class. In this respect it is noted that WCDs can be associated with and belong to more than once subscriber class. Subscriber classes can be associated with a plurality of the uplink RACHs. Uplink RACHs can be designated for use by a plurality of the subscriber classes. WCDs can be permitted to use a plurality of the uplink RACHs.

A wireless communication device (WCD) operating in the wireless network can receive a configuration message that includes information that specifies, for each of a plurality of subscriber classes, particular subscriber class dimensions that define that a particular subscriber class. The WCD can also receive mapping information that, for each of a plurality of subscriber classes, maps each particular subscriber class to one or more of uplink random access channels (RACHs) designated for use by that particular subscriber class. Prior to attempting to use any of the uplink RACHs, the WCD can use this information to determine one or more particular subscriber classes that the particular WCD belongs to based on current subscriber class dimensions for a particular communication session that the particular WCD plans to initiate, and particular ones of the uplink RACHs the particular WCD is permitted to use to communicate with the base station based on the mapping information. The WCD can then transmit request information to a base station using one of the particular ones of the uplink RACHs that the particular WCD is permitted to use to communicate with the base station.

Embodiments of the present invention can apply to a number of network configurations. Prior to describing some embodiments with reference to FIGS. 2 and 3, an example of a wireless communication network configuration in which these embodiments can be applied will now be described with reference to FIG. 1.

Figure 1:
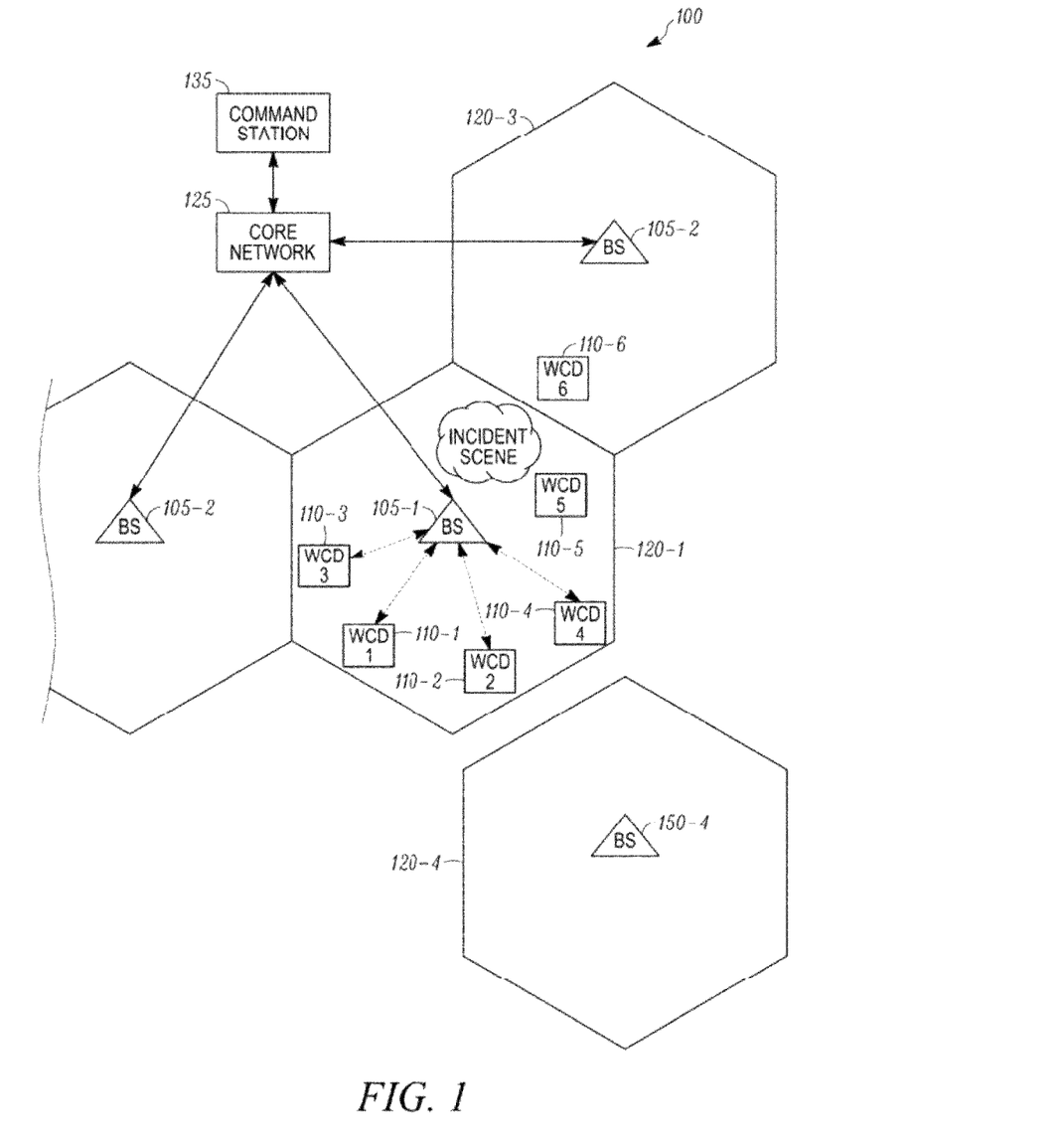
FIG. 1 illustrates a wireless communication network.

FIG. 1 is a block diagram that illustrates a portion of a cellular wireless communication network 100. The network 100 includes a number of wireless communication devices (WCDs) 110-n, a number of base stations 105-n that each define a corresponding cell 120-n, a core network 125 and a command station 135. The WCDs 110-n communicate over the air with a base station, and the base station 105 is coupled to the command station 135 via the core network 125. Communications between the base station and the WCDs 110-n may be in accordance with any wireless communication standard including the 3GPP, 3GPP2, Long Term Evolution (LTE), IEEE 802.11 and the IEEE 802.16 standards, which are incorporated by reference herein in their entirety. As used herein, the term "uplink (UL) or reverse link (RL)" refers to a communication link for carrying information from a station to a base station (or alternatively an access point), and can also refer to a transmission from a station to a base station. As used herein, the term "downlink (DL) or forward link (FL)"

refers a communication link that carries information from a base station (or alternatively an access point) to a station and can also refer to a transmission from a base station to a station. In the embodiments described herein, the UL and DL are implemented using multiple access methods including any one of FDMA, TDMA, CDMA, WCDMA, and OFDMA.

The WCDs 110 are wireless communication devices enabled to communicate directly with the base station 105 over wireless communication links, which are illustrated in FIG. 1 using double-ended, dashed-line arrows. A WCD is potentially mobile (i.e., not fixed) and can be mobile at any particular time, whereas the base station 105 is fixed at a particular location. Although not illustrated, each WCD 110 includes at least one antenna, a transceiver, at least one port, a controller and memory. The transceiver is used to transmit and receive both data and control/signaling/management information transmitted from the base station 105 via the antenna(s). The port is used for communications with base station 105 and is coupled to the controller for operation of the WCD 110. Each of the ports employs conventional demodulation and modulation techniques for receiving and transmitting communication signals to and from the WCD 110, respectively, under the control of the controller. The packetized signals include those described above. To perform the necessary functions of the WCD 110, the controller is coupled to the memory, which preferably includes a random access memory, a read-only memory (ROM), an electrically erasable programmable read-only memory (EEPROM), and flash memory. The memory can be integrated within the WCD 110, or alternatively, can be at least partially contained within an external memory such as a memory storage device. The memory storage device, for example, can be a subscriber identification module (SIM) card. A SIM card is an electronic device typically including a microprocessor unit and a memory suitable for encapsulating within a small flexible plastic card. The SIM card additionally includes an interface for communicating with the WCD 110.

The base station 105 can communicate data and/or control signaling information with the WCDs 110-n, where an uplink can carry data and/or control information transmitted from a WCD 110 to the base station 105 and a downlink can carry data information and/or control or signaling information transmitted from the base station 105 to a WCD 110. In some implementations, WCDs may communicate information directly with each other over peer-to-peer communication links (not illustrated) that carry information from one WCD to another.

The base station 105 comprises antennas, a transceiver, circuitry for analog-to-digital conversion and vice-versa, a plurality of ports, a controller that includes a resource scheduler module that schedules uplink resources for communications with various WCDs 110-n, and a memory.

Each port provides an endpoint or "channel" for network communications by the base station 105. Each port can be used to transmit and receive both data and control, signaling or management information. A backhaul port can provide an endpoint or channel for backhaul communications by the base station 105 with the core network 125. For example, the base station 105 can communicate with a wired backhaul via the backhaul port. Each of the ports are coupled to the controller for operation of the base station 105. Each of the ports employs conventional demodulation and modulation techniques for receiving and transmitting communication signals respectively, such as packetized signals, to and from the base station 105 under the control of the controller. The packetized signals can include, for example, voice, data or multimedia information, and control information. As used herein, the term "data" can refer to, for example, data generated by applications, a network management entity, or any other higher-layer protocol entities. Examples of user data include, for example, packets generated by voice, video, e-mail, file transfer applications and network management agents. As used herein, the term "control information" can refer to, for example, messages and signaling used by the media access control (MAC) layer and physical (PHY) layer to carry out its own protocol functionality. Control information includes periodic control information and aperiodic control information. As used herein, the term "periodic control information" can refer to, for example, preambles, midambles, synchronization sequences, timing and frequency correction channels or any other signaling used to ensure correct reception of the messages transmitted in a frame. Examples of periodic control information include, for example, frame control information, a synchronization channel, preamble information, information regarding the frame structure, markers which flag the start of the frame, and other types of control information. As used herein, the term "aperiodic control information" can refer to, for example, messages transmitted aperiodically to ensure proper protocol behavior and WCD upkeep. Examples of aperiodic control information include, for example, management and control information, such as capability announcements, ranging messages, measurement reports, and handoff instructions.

To perform the necessary functions of the base station 105, the controller is coupled to the memory, which preferably includes a random access memory, a read-only memory (ROM), an electrically erasable programmable read-only memory (EEPROM), and flash memory. The memory can be integrated within the base station 105, or alternatively, can be at least partially contained within an external memory such as a memory storage device.

To provide greater control over the network many decisions are made at the base station 105. For example, centralized scheduling algorithms can be implemented within the base station 105, and the base station 105 can be responsible for making resource scheduling decisions for allocating communication resources to the various WCDs 110-n operating within the cell 120 that is defined by the base station 105 (e.g., in the base station's "cell").

The command station 135 is responsible for managing a group of WCDs that are used by members of an organization (e.g., a public safety organization such as a police department, fire department, hospital, emergency clean up crew). Among its many functions that command station 135 is responsible for controlling use of uplink random access channels (RACHs) in each cell 120-n. An example of a method for controlling use of uplink RACHs in a cell 120 defined by a base station 105 will now be described with reference to FIG. 2.

Figure 2:
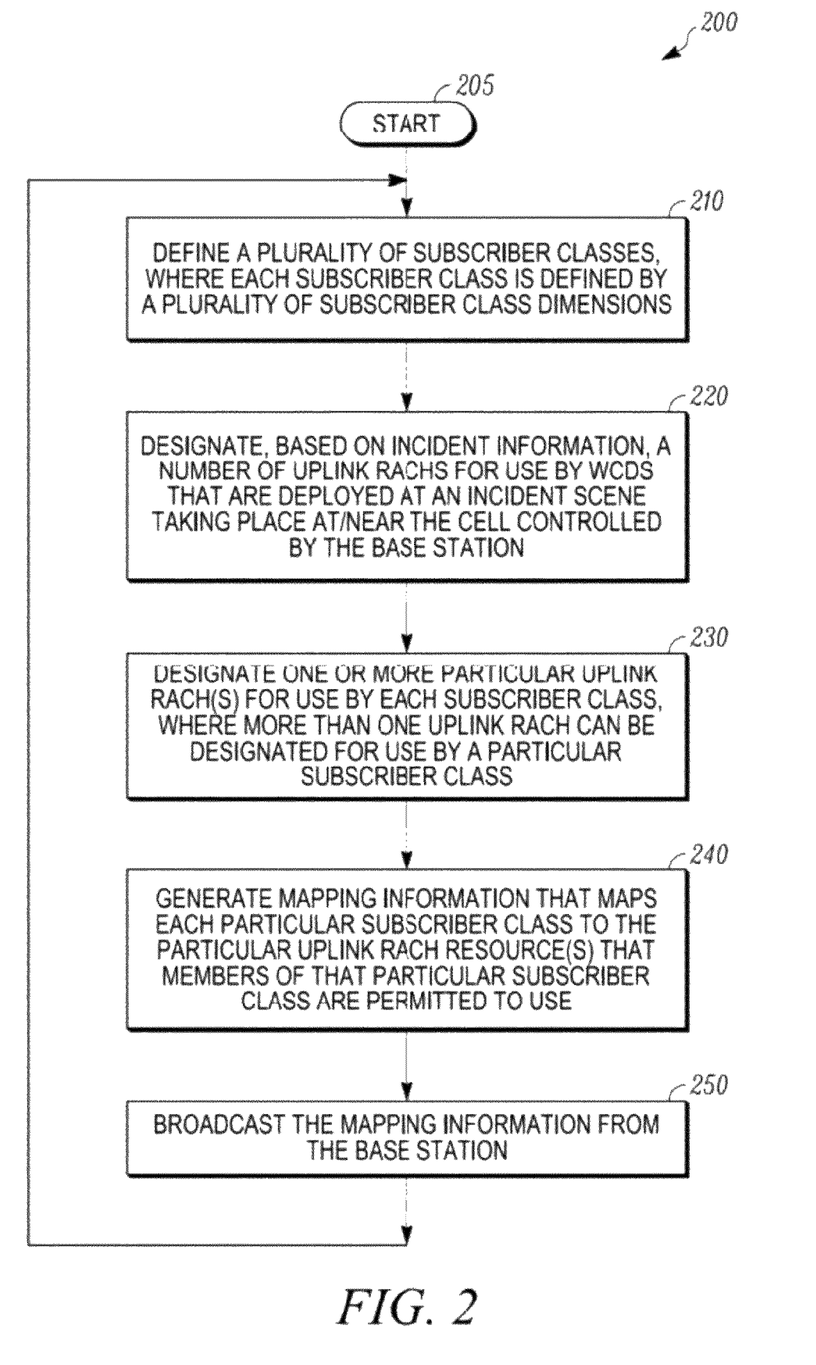
FIG. 2 is flow chart illustrating a method for controlling use of uplink random access channels (RACHs) in a cell in accordance with some embodiments.

FIG. 2 is flow chart illustrating a method for controlling use of uplink random access channels (RACHs) in a cell 120 defined by a base station 105 in accordance with some embodiments.

At step 210, the command station 135 dynamically defines a plurality of subscriber classes based on two or more subscriber class dimensions, and regularly sends a configuration message to the base station 105 that defines each subscriber class and the subscriber class dimensions that define each subscriber class. The base stations 105 the communicate this configuration message to the WCDs in their respective cells so that the WCDs can determine requirements of each subscriber class. Each base station can regularly broadcast the configuration message or unicast the configuration message to a particular WCD, for example, during registration or ondemand when requested by the WCD. As will be described below, the WCDs can eventually use the information provided via the configuration message to determine which subscriber classes they belong to. Wach WCD can belong to one or more of the subscriber classes.

Each subscriber class can be dynamically defined based on a plurality of subscriber class dimensions. As used herein, the term "subscriber class" refers to a group or set of subscriber WCDs that meet two or more subscriber class dimensions defined by a particular subscriber class. As will be described below, the subscriber class identifies the subscriber's operation mode. As used herein, the term "subscriber class dimension" can refer to information that can be used to distinguish among or differentiate between subscriber classes.

Subscriber Class Dimensions

The subscriber class dimensions can include, for example, an incident characteristics dimension, a user type dimension, and user function dimension, a location dimension, a presence dimension, an application type dimension that specifies a type of application being currently used by the user of the WCD, and/or an application priority dimension that is used to specify the relative priority of the application type as related to present state of incident. These subscriber class dimensions are simply examples of dimensions that can be used; however, it is to be appreciated that these examples are non-limiting, and that embodiments of the present disclosure can include any number of dimensions.

The incident characteristics can include at least one of: incident type; incident size; incident location; and state of the incident. In a public safety implementation, user types may comprise at least one of: public safety first responder (e.g., police, fire, medical personal), public safety second responder that assist the first responders as necessary (e.g., city workers, communications company personal, infrastructure maintenance personal, etc.), and public user. In one implementation, the user function dimension can be defined relative to the user type dimension and/or with respect to one or more of the incident characteristics.

Depending on the implementation, the location dimension can be determined by the command station (or other central server), the base station or the WCD itself, and can be specified using several different techniques. In one implementation, the location dimension can be provided by the command station 135 (or other central server) that has the system and incident views. In one implementation, the location dimension specifies an approximate distance between the particular WCD 110 and the incident location that is determined, for example, based on GPS coordinates. In another implementation, the base station can determine a value of the location dimension based on the actual distance to the incident scene. The base station can use GPS location information and the incident's GPS coordinates provided by the server to calculate the distance. In another implementation, the location dimension specifies a relative distance between the particular WCD 110 and the incident location. The relative distance can be specfied as a number of cells between the WCD 110 and the cell that the incident scene is taking place within to provide a general indication of how far the particular WCD 110 is away from the cell in which the incident scene is located sicne in many cases a particular set of cells may be "important" to a specific incident and as a WCD gets closer to the incident then that WCD should be allocated more RACHs. As the subscriber moves closer to the incident scene the location dimension value can change. In addition, the location dimension can be dependent on the user type or user function dimension. For instance, first and second responders that are assigned to different incidents may have different location dimension values in the same cell 120 due to different incidence scene locations. In another implementation, the WCD can determine a value of the location dimension based on the actual distance to the incident scene. The WCD can use its GPS location and the incident's GPS coordinates provided by the command station (or other server) to calculate a value of the location dimension. The WCD can monitor its location and dynamically updates value of the location dimension as needed. The WCD can update its location dimension value, for instance, when the user's incident assignment changes.

The presence dimension specifies availability of the user of a particular WCD for immediate action at the incident scene.

The application types may generally comprise one or more of: a voice-based application; a video-based application; a best effort application; and a background application. Examples of such applications may comprise one or more of: push-to-talk (PTT) application, a messaging application such as a short message service (SMS) application, conversational telephony application, a video streaming application, an imaging application, an emergency 911 application, a web best effort application, a video progressive download application, a presence application, a locationing application or any other type of application typically used by a wireless communication device.

At step 220, the command station 135 dynamically designates a number of the uplink RACHs for allocation to WCDs 110 that are deployed at a public safety incident scene 102 taking place within or near the cell 120-1 controlled by the base station 105-1. The number of uplink RACHs allocated by the base station can change dynamically. In some scenarios, the number of uplink RACHs can include all of the potentially available uplink RACHs available in the cell 120-1, and in other scenarios, the number of uplink RACHs can be less than all of the potentially available uplink RACHs (i.e., can include a subset of some of the uplink RACHs potentially available in the cell 120-1).

In one implementation, the command station 135 can determine the number of uplink RACHs to be allocated dynamically based on incident information. The incident information can include incident characteristics, such as incident type, incident size, incident severity level, incident location relative to the cell 120 location; and state of the incident. For instance, if the incident type is a fire in a single building located three cells 120 away from the current cell 120-4, then there is probably no need to reserve RACHs in this cell. If incident type is a biological disaster that occurred 3 hours ago in the current cell 120, then many of the RACHs in this cell will likely be reserved for use by first responder present in the cell where the incident scene is located. The number of uplink RACHs designated for allocation to the WCDs 110 can dynamically change. The base station 105 can adjust the number of RACHs, for example, when it is informed of a new incident or escalation of or closing an active incident. In one implementation, at least one RACH is allocated exclusively for use by WCDs 110 that belong to the public safety subscriber class such that use to this RACH is restricted to the WCDs 110 that belong to the public safety subscriber class.

At step 230, the command station 135 dynamically designates particular ones of the uplink RACHs for use by each one of the subscriber classes. One non-limiting example of how this designation would be done is illustrated in FIG. 4.

Figure 4:
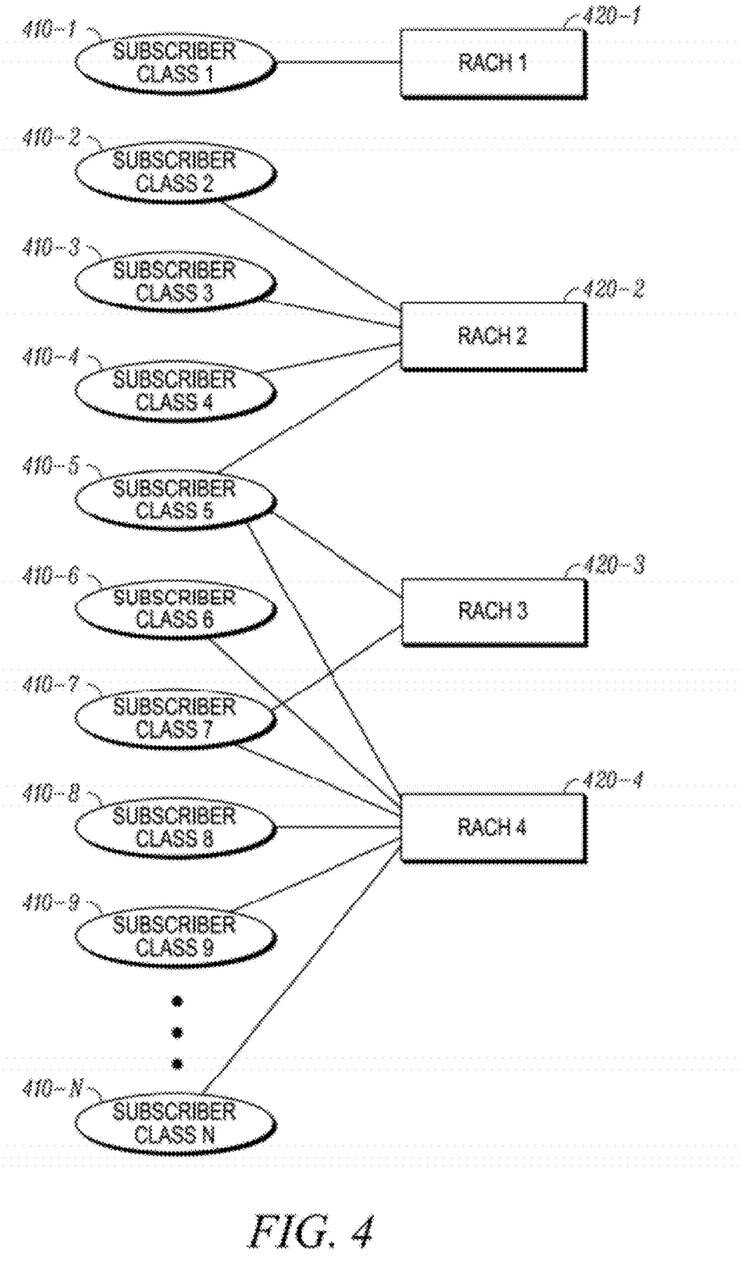
FIG. 4 is a conceptual diagram illustrating an example of a plurality of RACHs each being assigned to one or more of a plurality of subscriber classes.

FIG. 4 is a conceptual diagram illustrating an example of a plurality of RACHs 420-1 . . . 420-4 each being assigned to one or more of a plurality of N subscriber classes 410-1 . . . 410-N. As described above, any number subscriber classes can be defined, and each subscriber class 410-1 . . . 410-N is defined based on two or more subscriber class dimensions.

Each subscriber class 410-1 ... 410-N can be mapped to one or more of the RACHs. In otherwords, more than one uplink RACH can be assigned to or "designated for use by" a particular subscriber class. In many applications, at least one uplink RACH is assigned to each subscriber class. In addition, each RACH can be assigned for use by one or more subscriber classes (i.e., a particular uplink RACH can be used by multiple different subscriber classes). In this example, subscriber class 410-1 is mapped to RACH 420-1, subscriber classes 410-2, 410-3, 410-4, 410-5 are mapped to RACH 420-2, subscriber classes 410-5, 410-7 are mapped to RACH 420-3, and subscriber classes 410-5, 410-6, 410-7, 410-8, 410-9 and 410-N are mapped to RACH 420-4.

The number of uplink RACHs allocated to a particular subscriber class in a particular cell also change dynamically. Among other factors, the resource allocation mapping should consider the channel loading to manage the blocking probability and maintain access delays below the required maximum for different user subscriber classes. For instance, the anticipated session profile may be adjusted based on the number and type of users and incident's cell location. Then the anticipated session profile can be used to determine the necessary number of RACH resources and their allocation among the different subscriber classes.

At step 240, the command station 135 regularly generates mapping information that maps each of the subscriber classes to one or more of the uplink RACHs that have been allocated for use by particular subscriber class(es). The command station then sends the mapping information to the base stations 105. The mapping information specifies the particular ones of the uplink RACHs that have been designated for use by each of the subscriber classes (i.e., the mapping information indicates which subscriber classes are mapped to which RACHs). This mapping information can also change dynamically. An example of the mapping information between a group of subscriber classes and RACHs is illustrated in FIG. 4, which illustrates that each subscriber class can be mapped to one or more RACHs and that each RACH can be mapped to one or more subscriber classes.

At step 250, each base station 105 regularly broadcasts or "advertises" a system information message to WCDs in its cell. The system information message includes the mapping information and thus provides the WCDs with information regarding the RACHs for use by each subscriber class. Alternatively, the base station 105 can unicast mapping information to specific WCDs, for example, as part of a registration process when a WCD registers with the base station 105. Dynamic advertisement of RACHs associated with multi-dimension subscriber classes enables dynamic and efficient management of RACHs during public safety incidents. This way only specific user population with specific needs will attempt to use the specific RACH.

In one implementation, mapping information regarding subscriber classes can be communicated to WCDs in a compressed format utilizing class profile indexes. A class profile index can be an integer that refers to a specific pre-defined set of subscriber classes that is known to both WCD and infrastructure. For example, instead of using explicit listing of all subscriber classes allowed on a particular RACH, the base station can simply advertise a class profile index that represents this specific list of subscriber classes. Those class profile indexes can be predefined in the infrastructure and synchronized with WCDs.

The WCD's subscriber class, the subscriber class dimensions, the number of RACHs allocated for the incident and the mapping information can dynamically change over time as indicated by the feedback loop out of step 250. When a RACH is added to or removed, the command station 135 can modify the subscriber classes mapped to certain RACHs and then advertise new updated mapping information.

Figure 3:
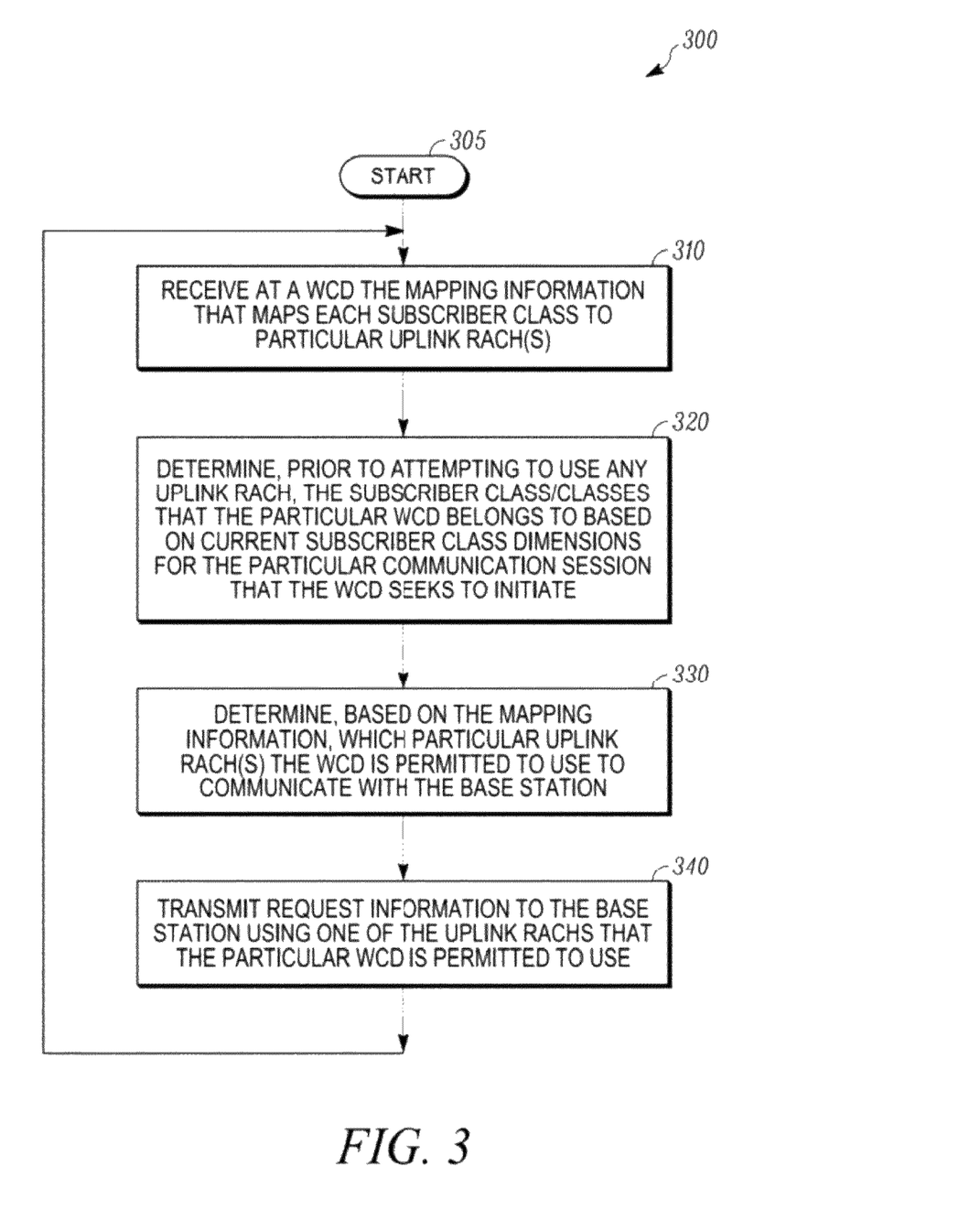
FIG. 3 is flow chart illustrating a method performed at a wireless communication device (WCD) for determining which particular uplink RACHs the WCD is permitted to use in accordance with some embodiments.

FIG. 3 is flow chart illustrating a method 300 performed at a wireless communication device (WCD) for determining which particular uplink RACHs the WCD 110 is permitted to use to communicate with the base station 105 in accordance with some embodiments.

Although not illustrated in FIG. 3, each WCD previously received a configuration message which defines the subscriber class dimensions of each subscriber class. When a WCD prepares to request resources, the WCD must first determine which RACHs it is permitted to use. To do so, the WCD must first determine which subscriber class or classes it is associated with based on the subscriber class dimensions associated with the communication session it is planning to request, set-up or initiate.

At step 310, the WCDs 110 receive the system information message from the BS that includes the mapping information that indicates which RACHs in that cell can be used by particular subscriber classes. At this point the WCDs 110 have all of the information needed to determine which RACHs they are permitted to use. The WCDs 110 will not attempt to communicate with the base station on the channels that are not allowed for this WCD's subscriber classes. In one implementation, the mapping information may be encoded such that WCDs will only be able to decode information about RACHs available for its particular subscriber classes.

Prior to attempting to use any uplink RACH, at step 320, a particular WCD 110 can determine which particular subscriber class or classes the particular WCD 110 belongs to before using any RACH. The WCD 110 can make this determination based on current subscriber class dimensions for the particular communication session the WCD 110 seeks to initiate. For instance, the WCD can determine specific subscriber class dimensions that apply to the communication session it plans to initiate, determine which particular subscriber class these subscriber class dimensions correspond to. At step 330, the WCD can determine, based on the mapping information, which of the particular ones of the uplink RACHs the particular WCD 110 is permitted to use to communicate with the base station 105. The particular WCD 110 will not attempt to communicate using uplink RACHs that it is not permitted to use.

Figure 5:
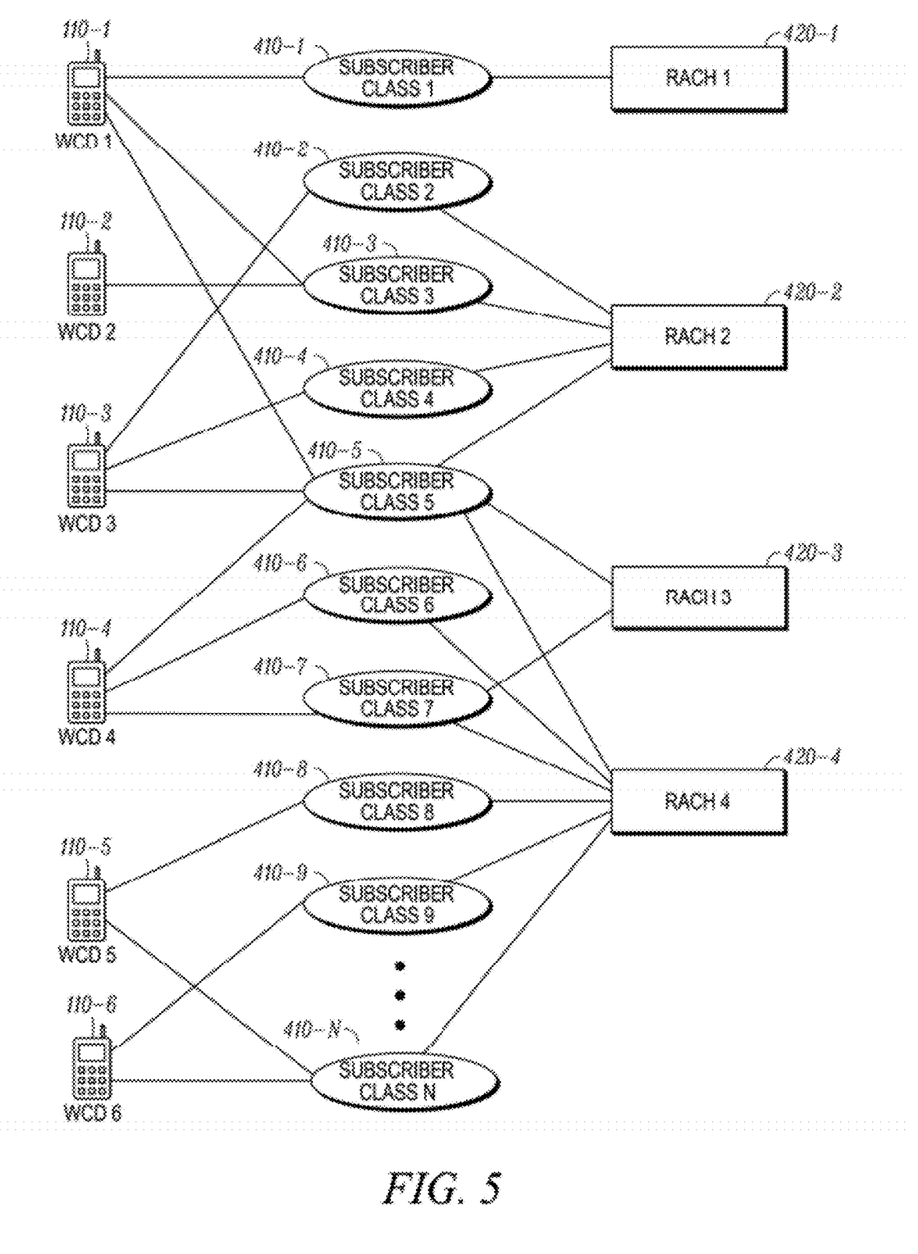
FIG. 5 is a conceptual diagram illustrating an example of mappings between a plurality of WCDs and their corresponding subscriber classes, and the mappings between a plurality of RACHs each being assigned to one or more of the subscriber classes.

Method 300 can be performed by each WCD 110 prior to attempting to use any RACH. One example of how WCDs map to subscriber classes and how those subscriber classes map to particular RACHs is illustrated in FIG. 5. FIG. 5 is a conceptual diagram illustrating an example of mappings between a plurality of WCDs 110-1 ... 110-6, and their corresponding subscriber classes 410-1 ... 410-N, and the mappings between a plurality of RACHs 420-1 ... 420-4 each being assigned to one or more of the subscriber classes 410-1 ... 410-N. Each WCD can belong to one or more of the sucbscriber classes so long as its meets the subscriber class dimensions for each of the subscriber classes that it is to belong to. As illustrated, each subscriber class can be mapped to one or more RACHs. As such, a particular WCD can be mapped to multiple RACHs via different subscriber classes.

As illustrated in this non-limiting example, WCD 110-1 is associated with subscriber classes 410-1, 410-3 and 410-5, and therefore is permitted to use RACH 420-1 when it determines that its subscriber class dimensions satisfy the definition of subscriber class 410-1, is permitted to use RACH 420-2 when it determines that its subscriber class dimensions satisfy the definition of subscriber class 410-3, and is permitted to use RACH 420-2, RACH 420-3 or RACH 420-4 when it determines that its subscriber class dimensions satisfy the definition of subscriber class 410-5. Similarly, WCD 110-2 is associated with subscriber classes 410-3, and therefore is permitted to use RACH 420-2 when it determines that its subscriber class dimensions satisfy the definition of subscriber class 410-3. In addition, WCD 110-3 is associated with subscriber classes 410-2, 410-4 and 410-5, and therefore is permitted to use RACH 420-2 when it determines that its subscriber class dimensions satisfy the definition of subscriber class 410-2, is permitted to use RACH 420-2 when it determines that its subscriber class dimensions satisfy the definition of subscriber class 410-4, and is permitted to use RACH 420-2, RACH 420-3 or RACH 420-4 when it determines that its subscriber class dimensions satisfy the definition of subscriber class 410-5.

At step 340, the particular WCD 110 transmits information to the base station 105 using one or more of the uplink RACHs that the particular WCD 110 is permitted to use to communicate with the base station 105.

EXAMPLE

An example of system information that can be advertised will now be described where two subscriber class dimensions are used to define different subscriber classes. In this example, the subscriber class dimensions include a user type dimension and an application type dimension. The user type dimension can be specified as follows: class 1.$x.y$ for public safety first responders, class 2.$x.y$ for pubic safety second responders, and class 3.$x.y$ for public subscribers. The application type dimension can be specified as follows: X=1 PTT, X=2 Telephony, X=3 Video streaming, X=4 Imaging, X=5 911, and X=6 Web best effort.

The following example describes mapping information broadcast by a base station 105-1 in a cell 120-1 that includes the incident scene 102 area. In this example, for simplicity of illustration, there are three RACHs to be allocated. In this example, it is assumed that the command station 135 allocates the RACHs as follows:

RACH 1=class 1.1; class 1.3; class 2.5;
RACH 2=class 1.1; class 1.3; class 2.5; class 3.5
RACH 3=class 1.1; class 1.3; class 2.5; class 2.2; class 3.5; class 3.2

This mapping information will allow the public safety first responders (1.$x$) to use RACH 1, 2 and 3 for PTT (*.1) and video streaming (*.3), will allow the public safety second responders (2.$x$) to use RACH 1, 2, and 3 for 911 calls (*.5) but only RACH 3 for telephone calls, and will allow general public subscribers (3.$x$) to use RACH 2 and 3 for 911 calls (*.5) but only RACH 3 for telephone calls. A WCD will perform round robin selection among all RACHs available for its use for the specific service. In this preceding example: the public safety first responders can pick any RACHs 1, 2, or 3 to send in a request for PTT or video session. The public safety second responders can pick any RACHs 1, 2, or 3 to start a 911 call. General public subscribers initiating a 911 call may pick only RACHs 2 or 3, and for ordinary (non-emergency) telephone calls only RACH 3 can be used. Therefore PTT and 911 public safety users will get "guaranteed" RACH on channel 1 (no public uses activity), shared RACH on channel 2 only for 911 calls, and additional shared RACH on channel 3. The 911 general public users will get 911 only RACH on channel and additional shared RACH on channel 3. Telephone calls get only shared RACH on channel 3. Thus, it can be seen that each subscriber class can be associated with one or more RACHs, each RACH can be associated with one or more subscriber classes, and further that each WCD can belong to one or more subscriber classes. As such, each WCD can be permitted to use a particular RACH under multiple different subscriber classes.

In one implementation, RACHs allocated or designated for a lower subscriber class may also be used by WCDs that belong to a higher subscriber class. For instance, a higher class subscriber may utilize the RACHs enabled for lower class subscribers for the same type of service. In the preceding example, first responders can be allowed to use any RACH for 911 calls but still only RACH on channel 3 for telephone calls.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for controlling use of particular uplink random access channels (RACHs) by wireless communication devices (WCDs) operating in a cell defined by a base station, the method comprising:
   defining, at a command station, a plurality of subscriber classes, wherein each subscriber class is dynamically defined based on a plurality of subscriber class dimensions;
   designating, at the command station, at least one uplink RACH for each subscriber class, wherein a WCD belonging to a particular subscriber class is permitted to use uplink RACHs designated for that particular subscriber class;
   generating subscriber class mapping information, at the command station, that maps each particular subscriber class to one or more of the uplink RACHs designated for use by that particular subscriber class;
   broadcasting, from the base station, the subscriber class mapping information to a first WCD in the cell;
   determining, at the first WCD based on the subscriber class mapping information, which of the at least one uplink RACH the first WCD is permitted to use to communicate with the base station; and
   transmitting request information from the first WCD to the base station using the at least one uplink RACH that the first WCD is permitted to use to communicate with the base station.

2. A method according to claim 1, wherein at least one WCD is associated with and belongs to more than one subscriber class.

3. A method according to claim 1, wherein the plurality of subscriber class dimensions comprise:
   a user type dimension.

4. A method according to claim 3, wherein the plurality of subscriber class dimensions further comprise:
   an application type dimension that specifies a type of application being utilized by a user of a particular WCD.

5. A method according to claim 4, wherein the plurality of subscriber class dimensions further comprise:
   an incident characteristics dimension that includes information describing at least one of: incident type; incident size; incident location relative to the cell location; and state of the incident.

6. A method according to claim 4, wherein the user types specified by the user type dimension comprise at least one of:
   public safety first responder,
   public safety second responder, and
   public user.

7. A method according to claim 4, wherein the plurality of subscriber class dimensions further comprise:
   a user function dimension that describes a role of a user of a particular WCD at the incident, wherein the user function dimension is defined relative to the user type dimension;
   a location dimension;
   a presence dimension that specifies availability of a user of a particular WCD for immediate action at the incident scene; and
   an application priority dimension that is used to specify the relative priority of the application type as related to present state of incident.

8. A method according to claim 7, wherein the user function dimension is defined with respect to one or more of the incident characteristics.

9. A method according to claim 7, wherein the location dimension specifies a distance between a particular WCD and the incident location.

10. A method according to claim 7, wherein the location dimension that specifies a relative distance between a particular WCD and the incident location as a number of cells between the particular WCD and a cell that the incident is located within.

11. A method according to claim 4, wherein the application types comprise one or more of:
   a voice-based application;
   a video-based application;
   a best effort application; and
   a background application.

12. A method according to claim 1, wherein at least one uplink RACH is designated for use by a plurality of the subscriber classes, and wherein at least one subscriber class is associated with a plurality of the uplink RACHs.

13. A method according to claim 1, wherein at least one WCD is permitted to use a plurality of the uplink RACHs.

14. A method according to claim 1, further comprising:
   receiving a configuration message from the base station at the first WCD in the cell, wherein the configuration message specifies, for each subscriber class, particular subscriber class dimensions that define that particular subscriber class;
   receiving the subscriber class mapping information at the first WCD in the cell; and
   determining, at the first WCD prior to attempting to use any of the uplink RACHs, one or more particular subscriber classes that the first WCD belongs to based on current subscriber class dimensions for a particular communication session that the first WCD plans to initiate.

15. A wireless communication device (WCD) operable in a wireless network, comprising:
- a receiver configured to receive:
  - a configuration message comprising information that specifies, for each of a plurality of subscriber classes, particular subscriber class dimensions that define that particular subscriber class; and
  - subscriber class mapping information that, for each of a plurality of subscriber classes, maps each particular subscriber class to one or more of uplink random access channels (RACHs) designated for use by that particular subscriber class; and
- a processor configured to determine, prior to attempting to use any of the uplink RACHs, one or more particular subscriber classes that the WCD belongs to based on current subscriber class dimensions for a particular communication session that the WCD plans to initiate, and which of the particular ones of the uplink RACHs the WCD is permitted to use to communicate with a base station based on the subscriber class mapping information; and
- a transmitter configured to transmit request information to the base station using one of the particular ones of the uplink RACHs that the WCD is permitted to use to communicate with the base station.

16. A network infrastructure device designed to generate information to control use of particular uplink random access channels (RACHs) by wireless communication devices (WCDs) operating in a cellular network, the network infrastructure device comprising:
- a processor configured to:
  - define a plurality of subscriber classes,
  - designate at least one of uplink RACH for each subscriber class, and
  - generate subscriber class mapping information that maps each particular subscriber class to one or more of the uplink RACHs designated for use by that particular subscriber class,
- wherein each subscriber class is dynamically defined based on a plurality of subscriber class dimensions, and
- wherein a first WCD belonging to a particular subscriber class is permitted to use uplink RACHs designated for that particular subscriber class, such that the first WCD based on the subscriber class mapping information broadcasted by a base station to the first WCD, determines which of the at least one uplink RACH the first WCD is permitted to use to communicate with the base station and the first WCD transmits request information to the base station using the at least one uplink RACH that the first WCD is permitted to use to communicate with the base station.

17. A network infrastructure device according to claim 16, wherein at least one WCD is associated with and belongs to more than one subscriber class, wherein at least one subscriber class is associated with a plurality of the uplink RACHs, wherein at least one uplink RACH is designated for use by a plurality of the subscriber classes, and wherein at least one WCD is permitted to use a plurality of the uplink RACHs.

18. A network infrastructure device according to claim 16, wherein the plurality of subscriber class dimensions comprise:
- a user type dimension, wherein the user types specified by the user type dimension comprise at least one of: public safety first responder, public safety second responder, and public user; and
- an application type dimension that specifies a type of application being utilized by a user of a particular WCD, wherein the application types comprise one or more of: a short message service (SMS) application, push-to-talk (PTT) application, conversational telephony application, a video streaming application, an imaging application, an emergency 911 application, and a web best effort application.

19. A network infrastructure device according to claim 18, wherein the plurality of subscriber class dimensions further comprise:
- an incident characteristics dimension that includes information describing at least one of: incident type; incident size; incident location; and state of the incident;
- a user function dimension that describes a role of a user of a particular WCD at the incident, wherein the user function dimension is defined relative to the user type dimension, and is defined with respect to one or more of the incident characteristics;
- a location dimension that specifies a relative distance between a particular WCD and the incident location as a number of cells between the particular WCD and a cell that the incident is located within;
- a presence dimension that specifies availability of a user of a particular WCD for immediate action at the incident scene; and
- an application priority dimension that is used to specify the relative priority of the application type as related to present state of incident.

* * * * *

UNITED STATES PATENT AND TRADEMARK OFFICE
CERTIFICATE OF CORRECTION

| | |
|---|---|
| PATENT NO. | : 8,155,684 B2 |
| APPLICATION NO. | : 12/409994 |
| DATED | : April 10, 2012 |
| INVENTOR(S) | : Agulnik et al. |

It is certified that error appears in the above-identified patent and that said Letters Patent is hereby corrected as shown below:

In Column 7, Line 4, delete "Wach" and insert -- Each --, therefor.

In Column 7, Line 56, delete "specfied" and insert -- specified --, therefor.

In Column 7, Line 60, delete "sicne" and insert -- since --, therefor.

In Column 10, Line 55, delete "sucbscriber" and insert -- subscriber --, therefor.

In Column 11, Line 63, delete "channel" and insert -- channel 2 --, therefor.

Signed and Sealed this
First Day of January, 2013

David J. Kappos
*Director of the United States Patent and Trademark Office*